(12) United States Patent
Nelson et al.

(10) Patent No.: US 8,162,536 B2
(45) Date of Patent: Apr. 24, 2012

(54) COMBINED SENSOR

(75) Inventors: Charles S. Nelson, Fenton, MI (US);
Raymond L. Bloink, Swartz Creek, MI (US)

(73) Assignee: Delphi Technologies, Inc., Troy, MI (US)

( * ) Notice: Subject to any disclaimer, the term of this patent is extended or adjusted under 35 U.S.C. 154(b) by 721 days.

(21) Appl. No.: 12/335,228

(22) Filed: Dec. 15, 2008

(65) Prior Publication Data
US 2010/0150205 A1 Jun. 17, 2010

(51) Int. Cl.
*G01K 7/18* (2006.01)
*H01C 3/04* (2006.01)
(52) U.S. Cl. ............... 374/144; 374/185; 338/25
(58) Field of Classification Search .......... 374/141, 374/144, 185; 338/25
See application file for complete search history.

(56) References Cited

U.S. PATENT DOCUMENTS

| | | | |
|---|---|---|---|
| 4,901,051 A * | 2/1990 | Murata et al. ............... 338/25 |
| 5,242,225 A * | 9/1993 | Kasanami et al. ............ 374/185 |
| 5,561,411 A * | 10/1996 | Kuzuoka ................. 338/22 SD |
| 5,823,680 A * | 10/1998 | Kato et al. .................. 374/185 |
| 6,241,146 B1 * | 6/2001 | Wienand et al. ........... 228/248.1 |
| 6,358,383 B2 | 3/2002 | Nelson et al. |
| 6,562,215 B1 | 5/2003 | Nelson et al. |
| 6,579,435 B2 | 6/2003 | Wang et al. |
| 6,653,926 B1 * | 11/2003 | Zitzmann ...................... 338/25 |
| 6,762,671 B2 | 7/2004 | Nelson |
| 6,766,574 B2 * | 7/2004 | Mizoguchi et al. ............ 29/611 |
| 6,984,298 B2 | 1/2006 | Polikarpus et al. |
| 7,280,028 B2 * | 10/2007 | Nelson et al. ............... 338/22 R |
| 2002/0084885 A1 * | 7/2002 | Wienand et al. ............... 338/25 |
| 2004/0178069 A1 * | 9/2004 | Wang et al. .................. 204/408 |
| 2009/0115567 A1 * | 5/2009 | Wienand et al. ............... 338/25 |
| 2011/0139618 A1 * | 6/2011 | Serrels et al. ................ 204/408 |

* cited by examiner

*Primary Examiner* — Christopher Fulton
(74) *Attorney, Agent, or Firm* — Mark H. Svoboda

(57) ABSTRACT

A method of manufacturing an exhaust temperature sensor is disclosed. It includes forming a green ceramic substrate; and printing an electrical circuit on the green ceramic substrate. The method then contemplates trimming the electrical circuit to a predetermined resistance prior to firing the green ceramic. Finally, the method contemplates firing the green ceramic substrate with the electrical circuit thereon.

16 Claims, 3 Drawing Sheets

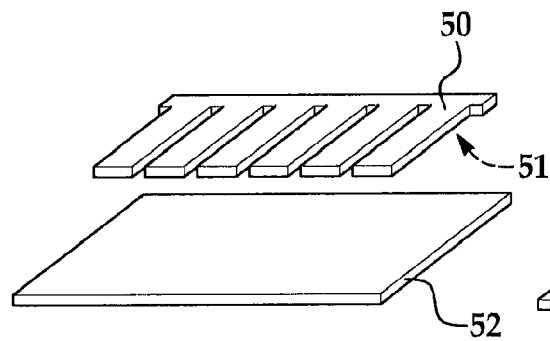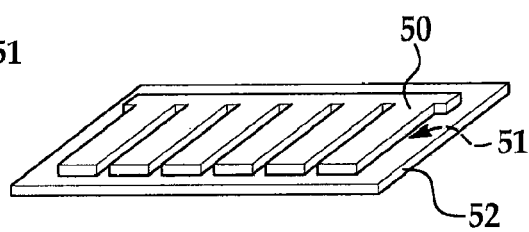
FIG. 3A  FIG. 3B
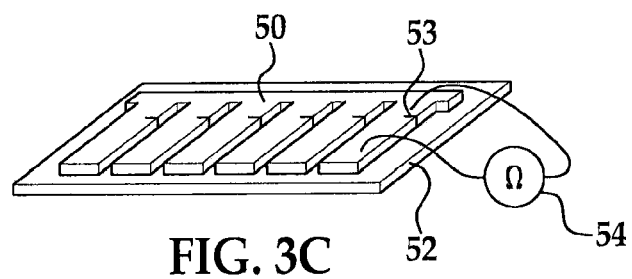
FIG. 3C
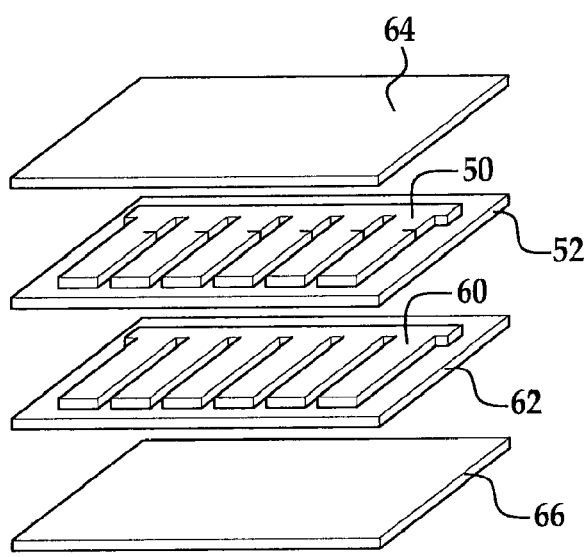
FIG. 3D
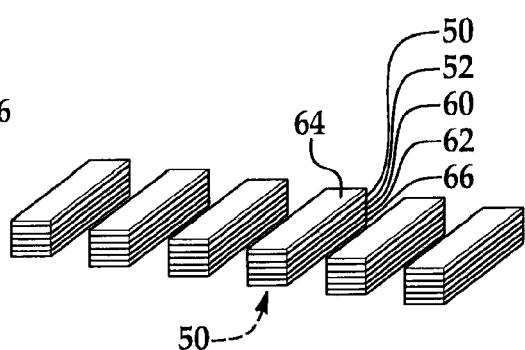
FIG. 3E

COMBINED SENSOR

The present disclosure relates to vehicle exhaust gas temperature sensors.

BACKGROUND OF THE INVENTION

A typical modern automobile includes an engine control system that provides closed loop fueling control. The control loop can include feedback paths that provide information from a number of exhaust gas sensors. These sensors generate respective signals that represent a predetermined combination of exhaust gas temperature and oxygen level, fuel/air ratio, or the like. Each sensor may be mounted in a respective housing, which is in turn mounted in a respective hole or mounting boss that allows the sensor to access the exhaust gas. Some implementations mount more than one sensor within a housing. This reduces the costs associated with making and assembling multiple housings and mounting bosses.

Referring now to FIG. 1, a cross section is shown of an exhaust gas temperature sensor 10 that is constructed in accordance with the prior art. Temperature sensor 10 employs a resistive thermal device (RTD) 12 that generates the exhaust temperature signal. RTD 12 is positioned on an alumina base 14. RTD 12 changes resistance based on the exhaust gas temperature. An engine control circuit senses the resistance and converts it back to an exhaust gas temperature. It is therefore important that the relationship between the resistance of RTD 12 and the exhaust gas temperature is known.

RTD 12 can be formed of platinum, palladium, and the like. Since the exhaust gas can reach temperatures greater than 1000 degrees Celsius, protection is needed for RTD 12. Compounds in the exhaust gas can alter the resistance of RTD 12, which causes the relationship between resistance and exhaust gas temperature to drift. A solution to this problem is to place an alumina cover 16 over RTD 12. Alumina cover 16 blocks the exhaust gas compounds from reaching RTD 12. Glass 18 bonds alumina cover 16 to RTD 12. At high enough temperatures, glass 18 becomes permeable. The exhaust gas compounds may then diffuse through glass 18 to RTD 12. In an environment that combines high temperature with lean exhaust gas, glass 18 in immediate contact with RTD 12 can cause the relationship between resistance and exhaust gas temperature to drift.

Referring now to FIG. 2, a cross section is shown of another embodiment of an exhaust gas temperature sensor 20 that is constructed in accordance with the prior art. RTD 12 is positioned on substrate 14. Glass 22 is inked on and fired. Glass 22 seals only the sides of cover plate 16 to the sides of substrate 14. This arrangement can sever the direct transport mechanism that exists between glass 18 and RTD 12 in the embodiment of FIG. 1. However, inking glass 22 to the outside edges of cover plate 16 can allow glass ink to seep underneath cover plate 16 and contact RTD 12. The glass will then cause the relationship between resistance and exhaust gas temperature to drift just as in the embodiment of FIG. 1.

The embodiments of FIGS. 1 and 2 both provide methods of using glass to bind a pre-fired alumina cover plate 16 to substrate 14. In both of the embodiments described thus far, the glass meant to form a barrier from the exhaust gas can become soft or permeable at high temperatures. As a result, even the glass allows the contaminants from the exhaust gas to reach RTD 12. Substitutes for the glass such as alumina ink, cannot generally be used to replace the glass ink because of a shrinkage mismatch; in order for alumina to be impermeable, it must first be sintered.

SUMMARY OF THE INVENTION

A method of manufacturing an exhaust temperature sensor is presented. The method includes forming a green ceramic substrate, printing an electrical circuit on the green ceramic substrate, and trimming the electrical circuit to a predetermined resistance prior to firing the green ceramic to form a trimmed pattern and placing at least one layer of green ceramic substrate over the trimmed pattern. Finally, the method contemplates firing the green ceramic substrate with the electrical circuit thereon. In a non-limiting embodiment, trimming the electrical circuit includes measuring a resistance of the electrical circuit and comparing the resistance to the predetermined resistance. The method then determines a relationship between the predetermined resistance and a resistance of the circuit after firing.

An exhaust temperature sensor is described. The sensor includes a green ceramic substrate and an electrical circuit printed on the green ceramic substrate. The electrical circuit includes an obstructed area formed by a portion that is trimmed away to give the circuit a predetermined resistance.

BRIEF DESCRIPTION OF THE DRAWINGS

The subject matter which is regarded as the invention is particularly pointed out and distinctly claimed in the claims at the conclusion of the specification. The foregoing and other features and advantages of the invention will become apparent from the following detailed description taken in conjunction with the drawings.

FIGS. 3A-3E are perspective views of exhaust temperature sensors at corresponding stages of manufacture, in accordance with the present invention;

DETAILED DESCRIPTION OF THE INVENTION

Figure 1:
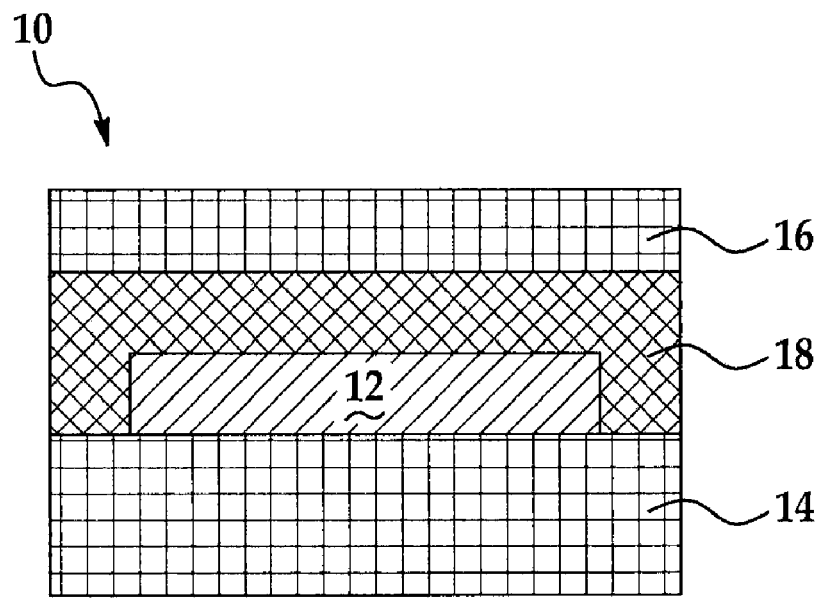
FIG. 1 is a cross section of an exhaust temperature sensor in accordance with the prior art.
Figure 2:
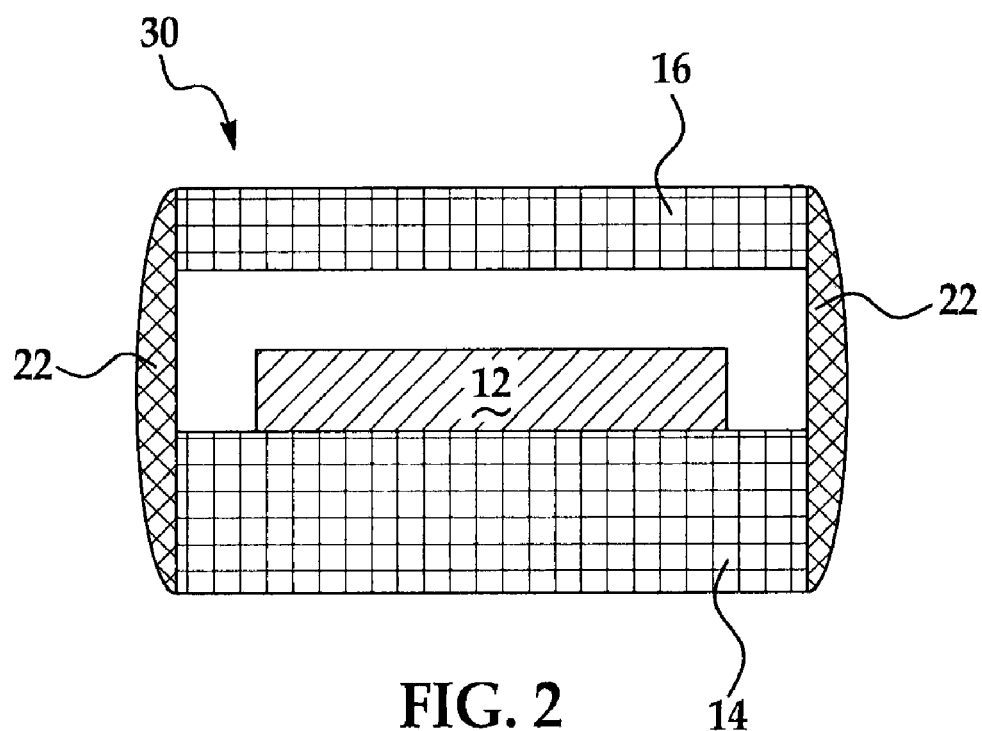
FIG. 2 is a cross section of another exhaust temperature sensor in accordance with the prior art.

Referring now to FIGS. 3A-3E, where the invention will be described with reference to specific embodiments without limiting same, a process is shown that produces resistive thermal device (RTD) exhaust gas temperature sensors. The process eliminates the glass ink and associated problems that are found in the prior art and discussed above. The resultant sensors maintain accuracy at high temperatures. The process employs high temperature co-fired ceramic (HTCC) technology.

Referring now to FIG. 3A, a first step of the process is shown. A plurality of RTD elements 50 is formed of green alumina tape with a printed electrical circuit 51 of platinum ink. Platinum ink printed electrical circuit 51 may be thin film or thick film.

The process then proceeds to FIG. 3B and laminates the ink side of RTD elements 50 with a polyester sheet 52. In practice, the polyester sheet 52 currently used is a MYLAR brand polyester sheet. This lamination step presses the platinum ink circuit 51 into the green alumina tape prior to a laser trimming. Pressing the platinum ink circuit 51 reduces its resistance and minimizes its resistance change through the remainder of the process. The reduction in resistance can be greater than a factor of 15.

The process then proceeds to FIG. 3C. In a conventional manner, an ohmmeter 54 is employed during a trimming process. Trimming cuts 53 are performed on green RTD elements 50 that form a trimmed pattern to increase the resistance of printed circuit 51 by creating an obstructed portion relative to the remainder of circuit 51. The predetermined resistance is checked using ohmmeter 54. While it will be appreciated that trimming cuts 53 may be performed by any method, the depicted trimming cuts 53 are made with a laser which removes a portion of platinum ink circuit 51, and are normal to the surface of each of RTD elements 50. Once the predetermined resistance is achieved, as determined by the ohmmeter 54, trimming is complete.

It is important to note that the resistance changes when RTD elements 50 are fired. The relationship between the pre- and post-firing resistances is first experimentally determined. Once the desired post-fire resistance is known or specified, then the relationship to the prefired resistance is used to determine the predetermined resistance that is the objective when trimming the green RTD elements 50. Using this closed loop trimming method effectively provides a close tolerance for the final fired product.

After trimming, RTD elements 50 are placed and laminated, as seen in FIG. 3D. Specifically, RTD elements are laminated with other green sensor elements 60. Obviously other green sensor elements 60 may be used depending on the specific end use application, including but not limited to, oxygen sensors, particulate matter sensors or lambda sensors. Green sensor elements 60 are laminated with an associated polyester sheet 62. A first protective layer 64 and a second protective layer 66 are employed at the top and bottom, respectively, of the lamination stack. Depending on the application, one or both of protective layers 64, 66 may be eliminated. The lamination stack is pressed together and, as shown in FIG. 3E, the individual sensors are singulated and fired. In one embodiment, a six-hour hold at 1450° C. has been found to provide a resistance that does not deviate from a predetermined resistance while the sensor is in its intended use.

Figure 4:
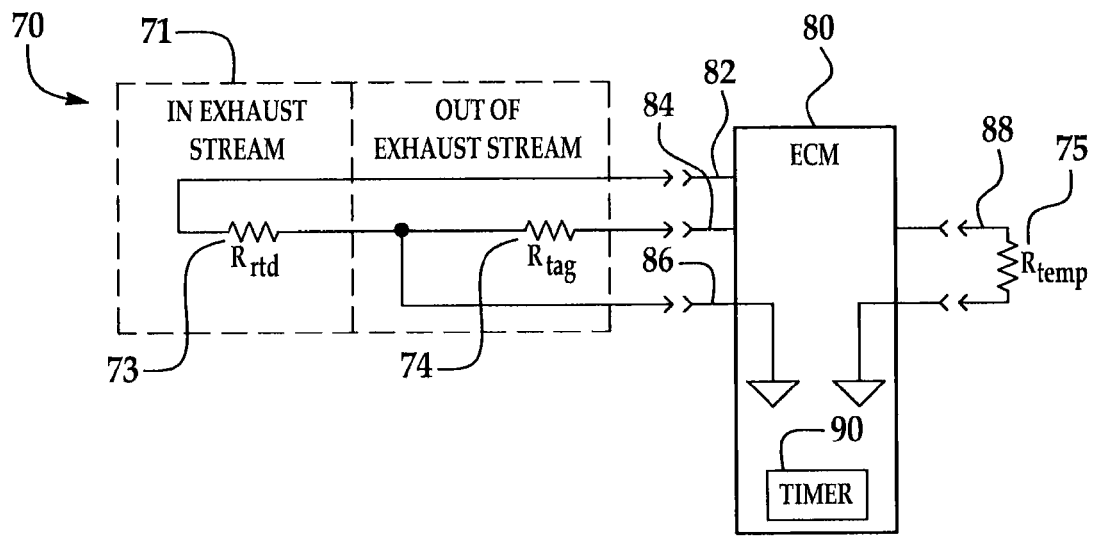
FIG. 4 is a functional block diagram of an engine control system.

Referring now to FIG. 4, a functional block diagram is shown of an engine control system 70. Engine control system 70 includes a fired RTD 50 that was produced in accordance with the process that is shown in FIGS. 3A-3E. A resistor $R_{rtd}$ 73 represents one of the plurality of RTD elements 50 formed by the process described hereinabove.

In the system 70 shown, an engine control module (ECM) 80 reads the resistance of $R_{rtd}$ 73 and the resistance of a resistor $R_{tag}$ 74 that is described below in more detail. ECM 80 also reads a third temperature sensor $R_{temp}$ 75. Temperature sensor $R_{temp}$ 75 can sense any one of a number of engine component or fluid temperatures, including coolant temperature, intake air temperature, battery temperature, ambient air temperature, cylinder head temperature, exhaust gas temperature and others. ECM 80 also includes a timer 90. Timer 90 and temperature resistor $R_{temp}$ 75 are employed by a method 100 that is described below in more detail.

Tag resistor $R_{tag}$ 74 indicates a correction factor for the relationship between exhaust gas temperature sensed and the resistance of $R_{rtd}$ 73. Tag resistor $R_{tag}$ 74 is located within a housing 71 that also mounts $R_{rtd}$ to the vehicle exhaust system. However Tag resistor $R_{tag}$ 74 may be located in any other suitable location. In either case, tag resistor $R_{tag}$ 74 should be positioned at a location that is out of the exhaust stream, since such positioning reduces resistance changes that will otherwise occur due to temperature changes. In addition, the location of tag resistor $R_{tag}$ 74 should be chosen so that it remains at as constant a temperature as possible, thus it may be desirable to remotely locate tag resistor $R_{tag}$ 74 from housing 71, such as for example, in a wiring harness that attaches to housing 71. Tag resistor $R_{tag}$ 74 can alternatively be formed within the same laminate stack as $R_{rtd}$ 73 by the process shown in FIGS. 3A-3E. Tag resistor $R_{tag}$ 74 can also be trimmed and formed of a material that has a low thermal coefficient of resistance (TCR).

Both $R_{rtd}$ 73 and tag resistor $R_{tag}$ 74 provide a resistance signal to ECM 80. ECM 80 compares the two signals and determines how much the $R_{rtd}$ 73 deviates from its predetermined resistance. When the resistance of tag resistor $R_{tag}$ 74 indicates a percentage difference between the predetermined and actual resistance of $R_{rtd}$. ECM 80 compensates for the difference in resistances based on the relationship $$R_t = R_{200}/R_{tag}(1+aT-bT^2), \text{ wherein}$$

$R_t$ is the resistance for a PT200 RTD at the sensed temperature, $R_{200}$ is the predetermined resistance of $R_{rtd}$ 73 (for example 200 ohms at 0 deg. C.). $R_{tag}$ 74 is the multiplier representing the resistance $R_{tag}$ 74 deviates from the desired resistance, a and b are alpha and beta values, respectively, of ink 51 that was used to form $R_{rtd}$ 73, and T is the measured temperature of exhaust gas temperature, as measured by $R_{temp}$ 75.

Figure 5:
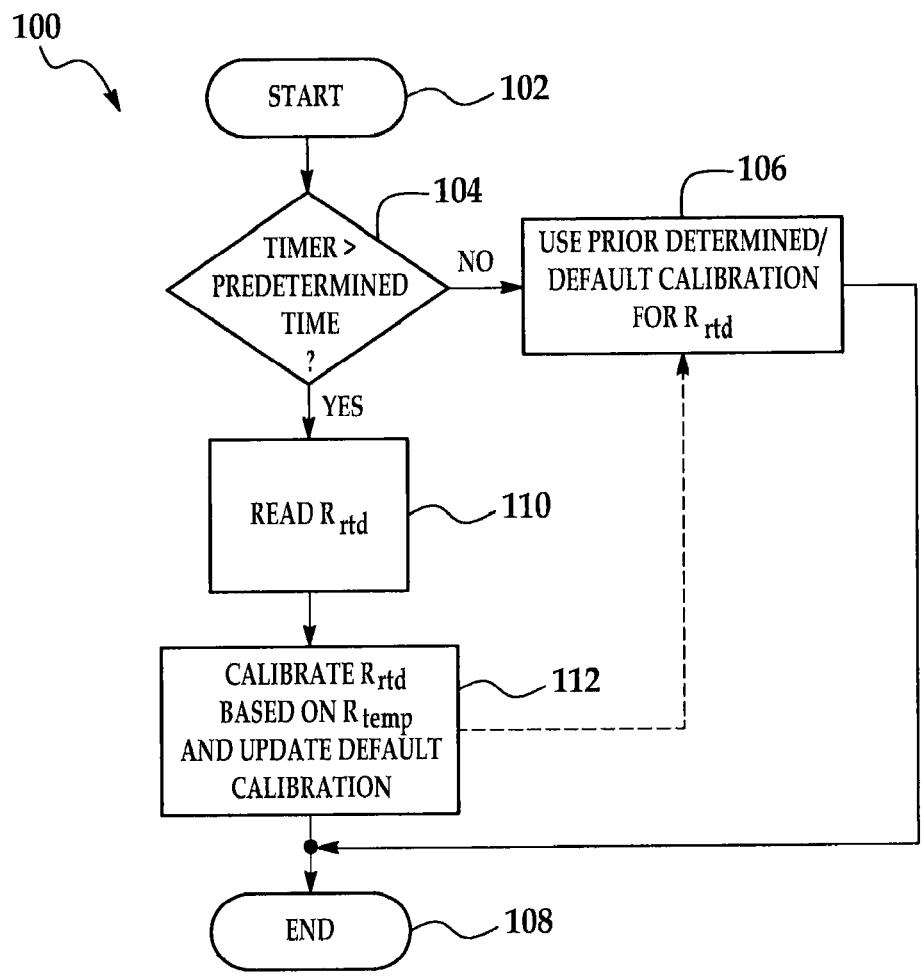
FIG. 5 is a flowchart of a method that calibrates the exhaust temperature sensor.

Referring now to FIG. 5, a method 100 is shown that determines the relationship between the exhaust gas temperature and the resistance of resistor $R_{rtd}$ 73. Method 100 waits for $R_{rtd}$ 73 and $R_{temp}$ 75 to reach a thermal equilibrium and then calibrates $R_{rtd}$ 73 based on the temperature that is indicated by $R_{temp}$ 75. ECM 80 may execute method 100 at anytime, including a time prior to the vehicle engine being started.

The control sequence of method 100 begins at block 102 and immediately proceeds to a decision block 104. At decision block 104, ECM 80 is fed signals by a timer 90 to determine how long the engine has been shut off, i.e. not running. If the engine has been shut off less than a predetermined amount of time then ECM 80 uses the previously determined relationship from the most recent prior calibration, as indicated at control block 106. If the ECM 80 is new and no relationship has been stored, then ECM will use a predetermined default relationship initially stored in control block 106, instead. Thereafter, the control sequence ends at block 108.

Alternatively, if the engine has been shut off for at least a predetermined time in decision block 104, then the control sequence reads $R_{temp}$, as indicated in control block 110 to determine the present ambient temperature. The control sequence then proceeds to block 112, where the relationship between the resistance of $R_{rtd}$ and the temperature of $R_{rtd}$ is determined based on the assumption that both $R_{rtd}$ 73 and $R_{temp}$ 75 are thermally soaked and at the same temperature. The determined relationship is stored for future use in control block 106 via a feed-back signal. Control then thereafter the control sequence ends at block 108.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method of manufacturing an exhaust temperature sensor, comprising:
   forming a green ceramic substrate;
   printing an electrical circuit on said green ceramic substrate;
   trimming said electrical circuit to a predetermined resistance prior to firing the green ceramic forming a trimmed pattern;
   placing at least one layer of green ceramic substrate over said trimmed pattern, and
   firing said green ceramic substrate with said electrical circuit thereon.

2. The sensor of claim 1, further comprising at least one of a lambda sensor, fuel/air sensor, particulate matter sensor, and oxygen sensor that is laminated with said green ceramic substrate.

3. The method of claim 1, wherein trimming said electrical circuit further comprises measuring a resistance of said electrical circuit, comparing the resistance to the predetermined resistance, ending said trimming step when said measured resistance and said predetermined resistance are about equal.

4. The method of claim 1, further comprising calibrating said sensor by determining a relationship said predetermined resistance and a measured resistance of said circuit after firing.

5. The method of claim 1, wherein said firing step comprises maintaining said circuit at a temperature about between 1000 deg. C. and 2000 deg. C. for about two to eight hours.

6. The method of claim 5, wherein said firing step comprises maintaining said circuit at said temperature for about four to six hours.

7. The method of claim 1, wherein said firing step comprises maintaining said circuit at a temperature between 1400 and 1500 deg. C.

8. The method of claim 7, wherein said firing step comprises maintaining said circuit at said temperature for about six hours.

9. The method of claim 1, wherein said printing of an electrical circuit includes printing with one of a platinum ink, Rhodium and a palladium ink.

10. The method of claim 1, wherein said trimming includes step further utilizing a laser that removes a portion of said electrical circuit.

11. A method of manufacturing an exhaust temperature sensor, comprising:
    forming a green ceramic substrate;
    printing an electrical circuit on said green ceramic substrate;
    trimming said electrical circuit to a predetermined resistance prior to firing the green ceramic forming a trimmed pattern;
    placing at least one layer of green ceramic substrate over said trimmed pattern, and
    firing said green ceramic substrate with said electrical circuit thereon, further comprising laminating said green ceramic substrate with a polyester film.

12. An exhaust temperature sensor, comprising:
    a green ceramic substrate; and
    an electrical circuit printed on said ceramic substrate, wherein said electrical circuit includes an obstructed portion relative to the remainder of the circuit.

13. The sensor of claim 12, further comprising a polyester film laminated with said green ceramic substrate.

14. The sensor of claim 12, wherein said electrical circuit is disposed between said green ceramic substrate and said polyester film.

15. The sensor of claim 12 wherein said electrical circuit includes one of a platinum ink, Rhodium and palladium ink.

16. The sensor of claim 12, further comprising at least one of a lambda sensor, fuel/air sensor, particulate matter sensor, and oxygen sensor that is laminated with said green ceramic substrate.

* * * * *